United States Patent Office 3,655,667
Patented Apr. 11, 1972

3,655,667
1-(2-BENZOYLCYCLOPROPYLMETHYL)-4-PHENYLPIPERAZINES
Carl Kaiser, Haddon Heights, N.J., and Charles L. Zirkle, Berwyn, Pa., assignors to Smith Kline & French Laboratories, Philadelphia, Pa.
No Drawing. Original application Apr. 4, 1968, Ser. No. 718,915, now Patent No. 3,553,226, dated Jan. 5, 1971. Divided and this application Aug. 12, 1970, Ser. No. 63,267
Int. Cl. C07d 51/70
U.S. Cl. 260—268 PH     4 Claims

ABSTRACT OF THE DISCLOSURE 1-(2-benzoylcyclopropylmethyl) - 4 - phenyl-1,2,5,6-tetrahydropyridines and related 4-phenylpiperazines in which the benzoyl group and/or the phenyl moiety may be substituted by chloro, bromo, fluoro, trifluoromethyl, methyl or methoxy, as well as the ethylene ketals thereof, have tranquilizing activity. The compounds are generally prepared from a 2-benzoylcyclopropanecarboxylic acid via reaction of the triethylamine salt with ethyl chloroformate to give the mixed anhydride which is condensed with a 4-phenyl-4-piperidinol or 1-phenylpiperazine to give a corresponding amide. The ethylene ketal of the amide is reduced to the cyclopropylmethyl derivative which is hydrolyzed with acid to the free ketone product.

---

This application is a division of application Ser. No. 718,915 filed Apr. 4, 1968, now Pat. No. 3,553,226.

This invention relates to novel 1 - (2-benzoylcyclopropylmethyl) - 4 - phenyl - 1,2,5,6-tetrahydropyridines and related 4-phenylpiperazines having useful pharmacodynamic activity. More specifically the compounds of this invention have tranquilizing activity as demonstrated in standard animal pharmacological test procedures. Exemplary of the activity of the compounds of this invention is the decreased motor activity, hypotonia, miosis, hypothermia and ptosis produced in rats upon oral administration of 25–200 mg./kg. At these dose levels no toxicity is observed.

The compounds of this invention are represented by the following general structural formula:

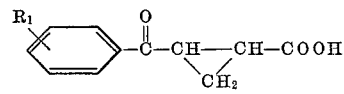

FORMULA I in which:

Z represents

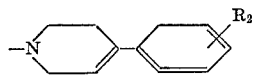

or

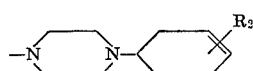

$R_1$ and $R_2$ each represent hydrogen, chloro, bromo, fluoro, trifluoromethyl, methyl or methoxy.

Also part of this invention are the ethylene ketals of the compounds of Formula I.

The compounds of this invention may be used in the form of a pharmaceutically acceptable acid addition salts having the utility of the free base. Such salts, prepared by methods well known to the art, are formed with both inorganic or organic acids, for example: maleic, fumaric, benzoic, ascorbic, pamoic, succinic, bismethylenesalicyclic, methanesulfonic, ethanedisulfonic, acetic, oxalic, propionic, tartaric, salicyclic, citric, gluconic, lactic, malic, mandelic, cinnamic, citraconic, aspartic, stearic, palmitic, itaconic, glycolic, p-aminobenzoic, glutamic, benzenesulfonic, hydrochloric, hydrobromic, sulfuric, sulfamic, phosphoric and nitric acids.

The compounds of this invention may be present as cis-trans isomers due to the geometrical arrangement of the benzoyl moiety and the heterocyclic substituent with respect to the cyclopropane ring and further as $d,l$ optical isomers. Unless otherwise specified in the description and accompanying claims, it is intended to include all isomers, whether separated or mixtures thereof.

The compounds of this invention are prepared from 2 - benzoylcyclopropanecarboxylic acids having the formula:

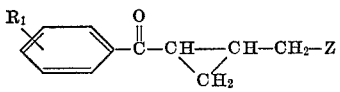

FORMULA II wherein $R_1$ is as defined above, which are prepared from 2-carbethoxycyclopropanecarboxylic acid chloride by reaction with $R_1$-substituted benzene and aluminum chloride under Friedel-Crafts conditions, followed by hydrolysis of the 2-benzoylcyclopropyl ester to the free acid. The useful compounds of formula II are converted to the products of this invention by reaction with a lower alkyl haloformate, preferably ethyl chloroformate, in the presence of a tertiary amine such as triethyl amine to give the corresponding 2-benzoylcyclopropyl mixed anhydride. The anhydride is then treated with a 4-($R_2$-substituted phenyl)-4-piperidinol or a 1-($R_2$-substituted phenyl)-piperazine to give a 2-benzoylcyclopropanecarboxamide. The amide is reacted with ethylene glycol in the presence of p-toluenesulfonic acid to give the ethylene ketal of the dehydrated 1,2,5,6-tetrahydropyridine carboxamide or the ethylene ketal of the piperazine carboxamide. The ethylene ketal carboxamide is reduced with, for example, lithium aluminum hydride to give the corresponding cyclopropylmethyl compound which is hydrolyzed by acid such as a mineral acid, for example hydrochloric acid, to yield the 2-benzoylcyclopropylmethyl product.

In addition to the utility of the ethylene ketal derivatives of the 2-benzoylcyclopropylmethyl compounds of Formula I as tranquilizers described above, it will be noted that these derivatives also are useful as intermediates for the preparation of the free ketones.

The compounds of this invention may be administered orally or parenterally in conventional dosage unit forms such as tablets, capsules, injectables or the like, by incorporating the appropriate dose of a compound of Formula I or its ethylene ketal derivative, either as the free base or an acid addition salt thereof, with carriers according to accepted pharmaceutical practices.

The foregoing is a general description of how to prepare the compounds of this invention. The following examples illustrate the preparation of specific compounds having tranquilizing activity. However this should not be construed as limiting the scope of the invention since appropriate variations in the starting materials, for example employing a corresponding cis isomer for a trans compound, will produce other products set forth hereinabove.

PREPARATIONS (A) 2-benzoylcyclopropanecarboxylic acid

A solution of 109.4 g. (0.693 m.) of trans-2-carbethoxycyclopropanecarboxylic acid and 66.5 ml. (0.923 m.)

of thionyl chloride is stirred on the steam bath for one hour. The reaction mixture is distilled to give the acid chloride, B.P. 105–115° C./30 mm.

To a mixture of 14.6 g. (0.11 m.) of aluminum chloride in 50 ml. of dry benzene, at room temperature with stirring, is added dropwise 17.7 g. (0.1 m.) of the above prepared acid chloride. This mixture is stirred and refluxed for one hour and then poured into ice-water-ether. The water layer is washed with ether and the ether-benzene solution is washed with water and saturated sodium chloride solution. The dried organic solution is concentrated and distilled to give ethyl trans-2-benzoylcyclopropanecarboxylate, B.P. 126–132° C./0.5 mm.

A solution of 6.7 g. (0.0307 m.) of the above prepared ethyl carboxylate and 4 g. of potassium hydroxide in 10 ml. of water and 100 ml. of alcohol is stirred and refluxed for two hours. The reaction mixture is evaporated in vacuo and the residue is dissolved in water and washed with ether. The aqueous solution is acidified with concentrated hydrochloric acid solution and extracted with ether. The ether solution is washed with water and saturated sodium chloride solution, dried and evaporated in vacuo to give trans-2-benzoylcyclopropane carboxylic acid, M.P. 113–118° C.

(B) 2 - ($R_1$ - substituted benzoyl)-cyclopropanecarboxylic acids

By employing in part A, $R_1$-substituted benzene with similar subsequent reaction there are obtained the corresponding 2-($R_1$-substituted benzoyl)-cyclopropanecarboxylic acid starting materials. Known Friedel-Crafts reaction conditions give the ortho, meta and para substituted derivatives. Isomeric mixtures, ortho or para substituted, which may result are separable by conventional organic chemical techniques based on physical properties.

Example 1.—A solution of 31.2 g. (0.16 m.) of trans-2-benzoylcyclopropanecarboxylic acid in 164 ml. of acetone and 33 ml. of water is stirred at room temperature while 29.5 g. (0.287 m.) of triethylamine in 82 ml. of acetone is added. The resulting solution is cooled to −5° C. and a solution of 31.2 g. (0.287 m.) of ethyl cholorformate in 82 ml. of acetone is added dropwise. The mixture is allowed to warm to room temperature, 65.8 g. (0.372 m.) of 4-phenyl-4-piperidinol in 410 ml. of acetone is added and the resulting mixture is stirred and refluxed for two hours. After standing overnight at room temperature the reaction mixture is filtered and the residue from the filtrate is triturated with methylene chloride. The methylene chloride filtrate is washed with water, dilute acid and base, dried and evaporated to give trans-1-(2-benzoylcyclopropanoyl)-4-phenyl-4-piperidinol, M.P. 165–167° C.

A mixture of 5.5 g. (0.022 m.) of the above prepared piperidinol and 0.31 g. of p-toluenesulfonic acid monohydrate in 150 ml. of ethylene glycol is stirred in a distilling apparatus, heated by an oil bath at 125–130° C., under 16 mm. pressure. The ethylene glycol is distilled slowly and after about four hours the residue is dissolved in water/ether. The ether layer is washed with water and saturated sodium chloride solution, dried and evaporated in vacuo to give the ethylene ketal of trans-1-(2-benzoylcyclopropanoyl)-4-phenyl-1,2,5,6-tetrahydropyridine.

To a mixture of 1.9 g. (0.015 m.) of lithium aluminum hydride in 100 ml. of dry ether, stirred at room temperature, is added slowly a solution of 4.8 g. (0.0122 m.) of the above prepared ethylene ketal in 500 ml. of dry ether. The resulting mixture is stirred and refluxed for three hours, decomposed as usual, filtered and the dried filtrate evaporated in vacuo to yield the ethylene ketal of trans-1-(2 - benzoylcyclopropylmethyl)-4-phenyl-1,2,5,6-tetrahydropyridine, maleate salt, M.P. 176–179° C.

A mixture of 3.4 g. (0.0712 m.) of the above prepared maleate salt in 250 ml. of dilute hydrochloric acid is warmed on the steam bath for two hours, cooled, made basic with 40% sodium hydroxide solution and extracted with ether/ethyl acetate. The extract is washed with water and saturated sodium chloride solution, dried and evaporated in vacuo to leave trans-1-(2-benzoylcyclopropylmethyl) - 4-phenyl-1,2,5,6-tetrahydropyridine, hydrochloride salt M.P. 214–217° C.

Example 2.—Following the procedures of Example 1, 2-benzoylcyclopropanecarboxylic acid is converted to its triethylamine salt, allowed to react with ethyl chloroformate and the resulting anhydride is condensed with 4-(p-chlorophenyl)-4-piperidinol to give the amide which is converted to its ethylene ketal derivative. The latter is reduced with lithium aluminum hydride and the ketal group removed by acid hydrolysis to yield 1-(2-benzoylcyclopropylmethyl) - 4 - (p-chlorophenyl)-1,2,5,6-tetrahydropyridine.

Similarly, by employing 4-(p-tolyl)-4-piperidinol or 4-(p-trifluoromethylphenyl)-4-piperidinol in the above described reaction sequence there are obtained 1-(2-benzoylcyclopropylmethyl)-4 - (p-tolyl)-1,2,5,6 - tetrahydropyridine or 1-(2-benzoylcyclopropylmethyl-4-(p-trifluoromethyl)-1,2,5,6-tetrahydropyridine, respectively.

Use of 4-(m-bromophenyl)-4-piperidinol or 4-(o-tolyl)-4-piperidinol in the above procedure results in the formation of 1-(2 - benzoylcyclopropylmethyl) - 4-(m-bromophenyl)-1,2,5,6-tetrahydropyridine or 1-(2-benzoylcyclopropylmethyl)-4 - (o-tolyl)-1,2,5,6 - tetrahydropyridine, respectively.

Use of fluoro or methoxy substituted phenylpiperidinols yields the corresponding fluoro or methoxy substituted products.

Example 3.—Following the procedures of Example 1, 2-(p-fluorobenzoyl)-cyclopropanecarboxylic acid triethylamine salt is reacted with ethyl chloroformate and 4-(p-chlorophenyl)-4-piperidinol is added to the resulting anhydride to give the amide. The ethylene ketal derivative of the amide is reduced with lithium aluminum hydride and the ketal group removed by acid hydrolysis to give 1-[2-(p-fluorobenzoyl)cyclopropylmethyl] - 4 - (p-chlorophenyl)-1,2,5,6-tetrahydropyridine.

Similarly, by employing 2 - (p-chlorobenzoyl)-cyclopropanecarboxylic acid as the starting material in the above described reaction sequence there is obtained 1-[2-(p-chlorobenzoyl)-cyclopropylmethyl] - 4 - (p-chlorophenyl)-1,2,5,6-tetrahydropyridine.

Example 4.—Following the procedures of Example 1, 31.2 g. of trans-2-benzoylcyclopropanecarboxylic acid is converted to its triethylamine salt and reacted with ethyl chloroformate to give the mixed anhydride. The latter is then reacted with 60.2 g. of 1-phenylpiperazine to give trans-1-(2-benzoylcyclopropanoyl)-4 - phenylpiperazine. The ethylene ketal derivative of the above prepared piperazine is reduced with lithium aluminum hydride to furnish the ethylene ketal of trans-1-(2-benzoylcyclopropylmethyl)-4-phenylpiperazine which is hydrolyzed with acid to the free trans-1-(2-benzoylcyclopropylmethyl)-4-phenylpiperazine.

Similarly, by employing 1-(o-m or p-chlorophenyl)-piperazine or 1-(o,m or p-methoxyphenyl)-piperazine in the above described reaction sequence with 2-benzoylcyclopropanecarboxylic acid as the starting material there are obtained 1-(2-benzoylcyclopropylmethyl)-4-(o,m or p-chlorophenyl)-piperazine or 1-(2-benzoylcyclopropylmethyl)-4-(o, m or p-methoxy-phenyl)-piperazine, respectively.

Use of 1-(o-tolyl)-piperazine in the above procedure yields the product 1-(2-benzoylcyclopropylmethyl)-4-(o-tolyl)-piperazine.

Example 5.—Following the procedures of Example 1, 2-(p-trifluoromethylbenzoyl)-cyclopropanecarboxylic acid triethylamine salt is reatced with ethyl chloroformate and 1-phenylpiperazine is added to the anhydride thus formed to give the amide. The ethylene ketal derivatives of the amide is reduced with lithium aluminum hydride and the ketal group removed by acid hydrolysis to yield 1-[2-(p-trifluoromethylbenzoyl) - cyclopropylmethyl]-4-phenylpiperazine.

Similarly, by employing 2-(o-methoxybenzoyl)cyclopropanecarboxylic acid or 2-(p-bromobenzoyl)-cyclopropanecarboxylic acid as the starting material in the above described reaction sequence there are obtained 1-[2-(o-methoxybenzoyl) - cyclopropylmethyl]-4-phenylpiperazine or 1-[2-(p-bromobenzoyl)-cyclopropylmethyl]-4-phenylpiperazine, respectively.

Use of 2-(m-tolyl)-cyclopropanecarboxylic acid in the above procedure gives 1-[2-(m-tolyl)-cyclopropylmethyl]-4-phenylpiperazine.

Example 6.—Following the procedures of Example 1, 2-(p-fluorobenzoyl)-cyclopropanecarboxylic acid triethylamine salt is reacted with ethyl chloroformate and 1-(o-methoxyphenyl)-piperazine is added to the anhydride thus formed to yield the amide. The ethylene ketal derivative of the amide is reduced with lithium aluminum hydride and the ketal group removed by acid hydrolysis to give 1-[2-(p-fluorobenzoyl) - cyclopropylmethyl] - 4-(o-methoxyphenyl)-piperazine.

What is claimed is:
1. A chemical compound of the formula:

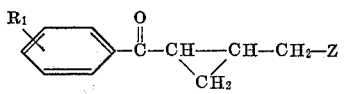

the ethylene ketal thereof or a pharmaceutically acceptable acid addition salt of said compound or ethylene ketal, wherein:

Z is

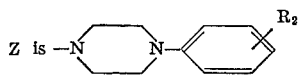

and $R_1$ and $R_2$ are each hydrogen, chloro, bromo, fluoro, trifluoromethyl, methyl methoxy.

2. A chemical compound according to claim 1 in which the compound is the free ketone.

3. A chemical compound according to claim 2 in which $R_1$ and $R_2$ are both hydrogen, being the compound 1-(2-benzoylcyclopropylmethyl) - 4-phenylpiperazine.

4. A chemical compound according to claim 1 in which the compound is the ethylene ketal.

References Cited

UNITED STATES PATENTS 3,268,533   8/1966   Freed _____ 260—268 PH

DONALD G. DAUS, Primary Examiner

U.S. Cl. X.R.

424—250